United States Patent
Keithley et al.

(10) Patent No.: US 10,580,070 B2
(45) Date of Patent: Mar. 3, 2020

(54) DISTRIBUTED SYSTEM FOR COMMERCE

(71) Applicant: PAYPAL, INC., San Jose, CA (US)

(72) Inventors: Thomas H. Keithley, Monkton, MD (US); Thomas E. Whitford, Newark, DE (US)

(73) Assignee: PAYPAL, INC., San Jose, CA (US)

( * ) Notice: Subject to any disclaimer, the term of this patent is extended or adjusted under 35 U.S.C. 154(b) by 109 days.

(21) Appl. No.: 14/817,180

(22) Filed: Aug. 3, 2015

(65) Prior Publication Data

US 2015/0339770 A1 Nov. 26, 2015

Related U.S. Application Data

(63) Continuation of application No. 12/250,978, filed on Oct. 14, 2008, now abandoned, which is a continuation of application No. 11/799,667, filed on May 2, 2007, now abandoned.

(51) Int. Cl.
| | | |
|---|---|---|
| *G06Q 40/00* | (2012.01) | |
| *G06Q 40/02* | (2012.01) | |
| *G06Q 20/24* | (2012.01) | |
| *G06Q 20/08* | (2012.01) | |
| *G06Q 20/20* | (2012.01) | |
| *G06Q 30/06* | (2012.01) | |
| *G06Q 20/12* | (2012.01) | |

(52) U.S. Cl.
CPC ........... *G06Q 40/025* (2013.01); *G06Q 20/08* (2013.01); *G06Q 20/12* (2013.01); *G06Q 20/204* (2013.01); *G06Q 20/24* (2013.01); *G06Q 30/06* (2013.01); *G06Q 30/0641* (2013.01); *G06Q 40/00* (2013.01); *G06Q 40/12* (2013.12)

(58) Field of Classification Search
CPC ....................................................... G06Q 40/02
USPC ......................................... 705/39; 706/35-39
See application file for complete search history.

(56) References Cited

U.S. PATENT DOCUMENTS

| | | |
|---|---|---|
| 3,920,908 A | 11/1975 | Kraus |
| 4,191,860 A | 3/1980 | Weber |
| 4,291,198 A | 9/1981 | Anderson et al. |
| 4,757,267 A | 7/1988 | Riskin |

(Continued)

FOREIGN PATENT DOCUMENTS

| | | |
|---|---|---|
| EP | 0338568 | 10/1989 |
| EP | 0829813 | 3/1998 |

(Continued)

OTHER PUBLICATIONS

Dimensions of Network Security Planning for Web Services, Author: Swart, Richard S; Marshall, Bryan A; Harris, Matthew E; Forcht, Karen A; Olsen, David Publication info: Journal of Information Privacy & Security 1.2: 49-66. Taylor & Francis Ltd. (Year: 2005).*

*Primary Examiner* — Bruce I Ebersman
*Assistant Examiner* — John A Anderson
(74) *Attorney, Agent, or Firm* — Haynes and Boone LLP

(57) ABSTRACT

A distributed system for commerce including a merchant system with a communication system for receiving, processing and transmitting data. The system further includes an intermediate server system in communication with the merchant system, and this intermediate server system includes a data storage system for storing data transmitted thereto, as well as a communication system for receiving, processing and transmitting data.

20 Claims, 2 Drawing Sheets

(56) References Cited

U.S. PATENT DOCUMENTS

| | | | |
|---|---|---|---|
| 4,969,183 A | 11/1990 | Reese | |
| 4,996,705 A | 2/1991 | Entenmann et al. | |
| 5,010,238 A | 4/1991 | Kadono et al. | |
| 5,012,077 A | 4/1991 | Takano | |
| 5,120,945 A | 6/1992 | Nishibe et al. | |
| 5,329,589 A | 7/1994 | Fraser et al. | |
| 5,446,885 A | 8/1995 | Moore et al. | |
| 5,537,315 A | 7/1996 | Mitcham | |
| 5,793,028 A | 8/1998 | Wagener et al. | |
| 5,794,221 A | 8/1998 | Egendorf | |
| 5,870,721 A | 2/1999 | Norris | |
| 5,883,810 A | 3/1999 | Franklin et al. | |
| 5,940,811 A | 8/1999 | Norris | |
| 6,000,832 A | 12/1999 | Franklin et al. | |
| 6,029,150 A | 2/2000 | Kravitz | |
| 6,029,890 A | 2/2000 | Austin | |
| 6,032,136 A | 2/2000 | Brake, Jr. et al. | |
| 6,078,891 A | 6/2000 | Riordan et al. | |
| 6,098,053 A | 8/2000 | Slater | |
| 6,105,007 A | 8/2000 | Norris | |
| 6,122,624 A | 9/2000 | Tetro et al. | |
| 6,188,994 B1 | 2/2001 | Egendorf | |
| 6,202,053 B1 | 3/2001 | Christiansen et al. | |
| 6,227,447 B1 | 5/2001 | Campisano | |
| 6,289,319 B1 | 9/2001 | Lockwood | |
| 6,317,783 B1 | 11/2001 | Freishtat et al. | |
| 6,332,134 B1 | 12/2001 | Foster | |
| 6,341,724 B2 | 1/2002 | Campisano | |
| 6,351,739 B1 | 2/2002 | Egendorf | |
| 6,477,578 B1 | 11/2002 | Mhoon | |
| 6,505,171 B1 | 1/2003 | Cohen et al. | |
| 6,675,153 B1 | 1/2004 | Cook et al. | |
| 6,704,714 B1 | 3/2004 | O'Leary et al. | |
| 6,785,661 B1 | 8/2004 | Mandler et al. | |
| 6,820,202 B1 | 11/2004 | Wheeler et al. | |
| 6,839,690 B1 | 1/2005 | Foth et al. | |
| 6,839,692 B2 | 1/2005 | Garrott et al. | |
| 6,868,408 B1 | 3/2005 | Rosen | |
| 6,883,022 B2 | 4/2005 | Van Wyngarden | |
| 6,889,325 B1 | 5/2005 | Sipman et al. | |
| 6,915,272 B1 | 7/2005 | Zilliacus et al. | |
| 6,931,382 B2 | 8/2005 | Laage et al. | |
| 6,957,334 B1 | 10/2005 | Goldstein et al. | |
| 6,970,853 B2 | 11/2005 | Schutzer | |
| 6,976,008 B2 | 12/2005 | Egendorf | |
| 6,980,970 B2 | 12/2005 | Krueger et al. | |
| 7,006,986 B1 | 2/2006 | Sines et al. | |
| 7,047,416 B2 * | 5/2006 | Wheeler | G06Q 20/00 380/282 |
| 7,051,001 B1 | 5/2006 | Slater | |
| 7,107,243 B1 | 9/2006 | McDonald et al. | |
| 7,177,836 B1 | 2/2007 | German et al. | |
| 7,263,506 B2 | 8/2007 | Lee et al. | |
| 7,406,442 B1 | 7/2008 | Kottmeier, Jr. et al. | |
| 7,752,132 B2 | 7/2010 | Stewart et al. | |
| 2001/0034702 A1 | 10/2001 | Mockett et al. | |
| 2001/0034724 A1 | 10/2001 | Thieme | |
| 2002/0007302 A1 | 1/2002 | Work et al. | |
| 2002/0007341 A1 | 1/2002 | Lent et al. | |
| 2002/0032860 A1 | 3/2002 | Wheeler et al. | |
| 2002/0035538 A1 | 3/2002 | Moreau | |
| 2002/0052833 A1 | 5/2002 | Lent et al. | |
| 2002/0069166 A1 | 6/2002 | Moreau et al. | |
| 2002/0087467 A1 | 7/2002 | Mascavage, III et al. | |
| 2002/0099649 A1 | 7/2002 | Lee et al. | |
| 2002/0107793 A1 | 8/2002 | Lee | |
| 2002/0112160 A2 | 8/2002 | Wheeler et al. | |
| 2002/0120537 A1 | 8/2002 | Morea et al. | |
| 2002/0120864 A1 | 8/2002 | Wu et al. | |
| 2002/0156688 A1 | 10/2002 | Horn et al. | |
| 2002/0178071 A1 | 11/2002 | Walker et al. | |
| 2002/0198822 A1 | 12/2002 | Munoz et al. | |
| 2003/0036996 A1 | 2/2003 | Lazerson | |
| 2003/0061157 A1 | 3/2003 | Hirka et al. | |
| 2003/0120615 A1 | 6/2003 | Kuo | |
| 2003/0144952 A1 | 7/2003 | Brown et al. | |
| 2003/0200184 A1 | 10/2003 | Dominguez et al. | |
| 2003/0212642 A1 | 11/2003 | Weller et al. | |
| 2004/0078328 A1 | 4/2004 | Talbert et al. | |
| 2004/0111362 A1 | 6/2004 | Nathans et al. | |
| 2004/0151292 A1 | 8/2004 | Larsen | |
| 2004/0186807 A1 | 9/2004 | Nathans et al. | |
| 2004/0230536 A1 | 11/2004 | Fung et al. | |
| 2004/0254894 A1 | 12/2004 | Tsuei et al. | |
| 2004/0257894 A1 | 12/2004 | Onogi et al. | |
| 2005/0038715 A1 | 2/2005 | Sines et al. | |
| 2005/0049974 A1 | 3/2005 | Jani et al. | |
| 2005/0071266 A1 | 3/2005 | Eder | |
| 2005/0125336 A1 | 6/2005 | Rosenblatt et al. | |
| 2005/0131808 A1 | 6/2005 | Villa | |
| 2005/0246278 A1 | 11/2005 | Gerber et al. | |
| 2006/0020542 A1 * | 1/2006 | Litle | G06Q 10/10 705/40 |
| 2006/0064372 A1 | 3/2006 | Gupta | |
| 2006/0106699 A1 | 5/2006 | Hitalenko et al. | |
| 2006/0178988 A1 | 8/2006 | Egendorf | |
| 2006/0184428 A1 | 8/2006 | Sines et al. | |
| 2006/0184449 A1 | 8/2006 | Eder | |
| 2006/0184570 A1 | 8/2006 | Eder | |
| 2006/0226216 A1 | 10/2006 | Keithley et al. | |
| 2006/0229974 A1 | 10/2006 | Keithley et al. | |
| 2006/0229996 A1 | 10/2006 | Keithley et al. | |
| 2006/0265335 A1 | 11/2006 | Hogan et al. | |
| 2006/0266819 A1 | 11/2006 | Sellen et al. | |
| 2006/0289621 A1 | 12/2006 | Foss, Jr. et al. | |
| 2007/0005445 A1 | 1/2007 | Casper | |
| 2007/0038485 A1 | 2/2007 | Yeransian et al. | |
| 2007/0056019 A1 | 3/2007 | Allen et al. | |
| 2007/0063017 A1 | 3/2007 | Chen et al. | |
| 2007/0073889 A1 | 3/2007 | Morris | |
| 2007/0080207 A1 | 4/2007 | Williams | |
| 2007/0094095 A1 | 4/2007 | Kilby | |
| 2007/0094114 A1 | 4/2007 | Bufford et al. | |
| 2007/0250919 A1 | 10/2007 | Shull et al. | |
| 2007/0288375 A1 | 12/2007 | Talbert et al. | |
| 2008/0040261 A1 * | 2/2008 | Nix | G06Q 20/04 705/39 |
| 2008/0040275 A1 | 2/2008 | Paulsen et al. | |
| 2008/0046334 A1 | 2/2008 | Lee et al. | |
| 2008/0052244 A1 | 2/2008 | Tsuei et al. | |
| 2008/0167956 A1 | 7/2008 | Keithley | |
| 2008/0195528 A1 | 8/2008 | Keithley | |
| 2008/0203153 A1 | 8/2008 | Keithley et al. | |
| 2008/0208760 A1 | 8/2008 | Keithley | |
| 2008/0255947 A1 | 10/2008 | Friedman | |
| 2008/0301056 A1 * | 12/2008 | Weller | G06Q 20/02 705/67 |
| 2009/0125430 A1 | 5/2009 | Krueger et al. | |

FOREIGN PATENT DOCUMENTS

| | | |
|---|---|---|
| EP | 1223524 | 7/2002 |
| WO | WO 88/10467 | 12/1988 |
| WO | WO 00/02150 | 1/2000 |
| WO | WO 00/67177 | 11/2000 |

* cited by examiner

DISTRIBUTED SYSTEM FOR COMMERCE

CROSS REFERENCE TO RELATED APPLICATIONS

This application is a continuation of U.S. patent application Ser. No. 12/250,978, filed Oct. 14, 2008, which is a continuation of U.S. patent application Ser. No. 11/799,667, filed May 2, 2007, all of which are incorporated herein by reference in their entirety.

BACKGROUND OF THE INVENTION

Field of the Invention

The present invention relates generally to credit systems and consumer, merchant and credit issuer relationships, and in particular, to a distributed system for commerce for interactions between consumers, merchants and credit issuers, where content is communicated between the parties in an intermediary and distributed form.

Description of the Related Art

In order to enable convenient purchases of goods and services by consumers, the financial service industry has developed many alternative payment methods that allow a consumer to engage in a transaction and receive goods and services on credit. For example, such alternative payment methods may include checks, ATM or debit cards, credit cards, charge cards, etc. Prior to the birth of virtual commerce, as discussed below, such payment options provided adequate convenience and transactional security to consumers and merchants in the marketplace. Virtual commerce and the growth of the Internet as a medium for commerce have placed pressure on the payment options discussed above on the convenience, transactional security and profitability by the credit issuer. Currently, available payment options include significant shortcomings when applied to remote purchasers, such as purchases where the buyer and the seller (that is, the merchant) are not physically proximate during the transaction. Specific examples of remote purchases are mail order, telephone order, the Internet and wireless purchases.

In a typical credit transaction and process, a consumer engages with a merchant at the point-of-sale, such as online at the merchant's website, at the merchant's business or store, over the telephone with the merchant's call/sales center, etc. The merchant sends a request to the credit issuer to obtain authorization or verification data allowing the consumer to consummate the sale. For example, the credit issuer may indicate to the merchant whether the consumer is creditworthy, is over his or her limit, is verified, has the available funds/balance to make the purchase, etc.

According to the prior art, and in the first instance, when a consumer wishes to obtain a credit product, such as a credit card or credit account, from a credit issuer, such as a bank, the consumer fills out an application, whether in hard copy of electronic form, and submits this application to the credit issuer. Once the appropriate information is received from the consumer, the credit issuer will make a decision regarding whether the applicant is eligible for credit product. If the person is, indeed, eligible, and meets the necessary requirements, the credit issuer establishes an account and provides the consumer with either the appropriate account information, or in most cases, a physical credit card for use in engaging in transactions. In addition, in order to successfully consummate the transaction, the consumer must have some preexisting relationship with some credit provider in order to facilitate any non-cash transaction, e.g., an online transaction, a telephone transaction, etc. Therefore, in order to engage in some non-cash purchases, the consumer must obtain credit, initiate the transaction with the merchant, and utilize the obtained credit product to consummate the transaction and receive the goods and/or services.

Once the credit product has been obtained by the consumer, and this credit product is used in connection with satisfying a transaction, the credit request is sent by a merchant to the payment processor. However, the payment processing industry is subject to the programming specifications and hierarchy of the payment processors. Therefore, the merchant communications, credit requests, authorization requests, etc. all "choke" at the payment processor system, which dictates the message format, required data and processing requirements. Accordingly, presently-existing payment processors impart severe limitations on new payment products and methods. In addition, small businesses and merchants do not have enough of a stake in the present process to convince payment processors to change process or the current systems.

These and other deficiencies in the presently-existing processes in the electronic payment industry may be further illustrated as follows. According to the prior art, electronic payment companies (credit issuers) mediate payment between a customer or buyer and a merchant or seller. The seller offers the electronic payment through their point-of-sale channels, e.g., call center, web-store, physical store, etc., and customers selecting the payment option need to be successfully authorized and settled by the merchant. This electronic authorization and settlement event may be done directly with the payment company, or done via an existing payment processor relationship that the merchant has in place for other payment options. The direct method is, by far, the less attractive of these options, because it forces the payment company to physically connect, their payment systems to each merchant. This, in turn, increases the cost of implementation and maintenance for the payment company. The cost is also higher from the merchant's point of view, since the merchant must add a new physical connection to their network and develop custom software to interface to the transaction application provider interface (API) for the new payment option.

Therefore the preferred option for payment companies and merchants is to access new payment services through the merchants preexisting payment processing partners. Since the merchant already maintains a physical connection to the payment processor, and since the merchant has already developed the appropriate programs to interface with the API of the processor, the level of effort to add an additional payment option is much lower. However, from the payment company's standpoint, there are still material shortcomings to this approach. For example, the payment processor's APIs are normally very large and complex software applications that are difficult and expensive for the payment processor to modify. Therefore, while this approach works well for the merchant, it is not preferable for the payment company, since they now have to pay the cost of the API modification to the payment processor, and wait for a lengthy period of time for the changes to be implemented.

Further, payment processors are independent companies in a highly concentrated industry. Presently, the top three payment processors control the majority of payment processing in the United States. Further, these payment processors have formed strategic alliances with specific payment service providers, who may seek to influence and/or restrict the addition of new and valuable payment alternatives to the processor's API. This further raises the cost and slows the implementation cycle for new payment options.

Yet another drawback to online commerce arises from the distributed nature of these electronic transactions, with the merchants likened to spokes around a hub, which is the network credit system. Such a distributed checkout service creates many unmanageable security risks. If all sales occur at the payment process or banking system, certain confidential information is collected at the spokes (merchants) to complete the transaction. This information distribution creates unnecessary risk to the hub. If the information is collected directly at the hub (credit issuer) location, the customer is redirected to the hub from the spoke, which may be undesirable to the merchant. For example, if the hub is the data repository, the merchant often does not trust that the hub will not use consumer to their own ends. In addition, the hub-centric approach often leads to access problems, processing capacity issues, possible offers of other competing goods, etc., which makes this approach undesirable.

SUMMARY OF THE INVENTION

Therefore, it is an object of the present invention to provide a distributed system for commerce, such as online and remote commerce between a consumer and a merchant, that overcomes the drawbacks and deficiencies of the prior art. It is a further object of the present invention to provide a distributed system for commerce that provides content to a user through a merchant system, where the content is provided by the merchant through an intermediary, or directly by an intermediary. It a still further object of the present invention to provide a distributed system for commerce that facilitates credit-based or debit-based transactions between a consumer, a merchant and a credit issuer. It is another object of the present invention to provide a distributed system for commerce that provides dynamic content to a user (or consumer) via the merchant system and/or intermediate server system. It is a further object of the present invention to provide a distributed system for commerce that provides an intermediary between the merchant and a credit issuer (payment company, electronic payment company, etc.) and a payment processor. It is a still further object of the present invention to provide a distributed system for commerce that provides secure communications and facilitates transactions in an electronic, online, telephone or remote environment.

Accordingly, in one embodiment, the present invention is directed to a distributed system for commerce. The system includes at least one merchant system, including a communications system for receiving, processing and/or transmitting data, as well as at least one intermediate server system in communication with the at least one merchant system. The intermediate server system includes a data storage system for storing data transmitted to the system and a communications system for receiving, processing and/or transmitting data.

In a further embodiment of the present invention, the system includes at least one payment processor system. This payment processor system includes a processing system for processing credit-based transactions and a communications system for receiving, processing and/or transmitting data. Further, the intermediate server system is in communication with the payment processor system.

In a still further embodiment of the present invention, the system includes at least one credit issuer system. The credit issuer system includes a processing system for processing credit data directed to at least one credit product and a communications system for receiving, processing and/or transmitting data. Further, the intermediate server system is in communication with the credit issuer system.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention.

The present invention is directed to a system 10 for use in commerce, e.g., commercial transactions, consumer/merchant relationships, consumer/merchant/credit issuer relationships, etc. In addition, the system 10 of the present invention is distributed, and particularly useful in connection in a networked environment N. In one embodiment, the system 10 facilitates commercial transactions between a user U (e.g., the consumer) and a merchant and/or credit issuer. The presently-invented system is equally useful in connection with debit issuers (financial institutions) and debit-based transactions, such that instances herein directed to "credit products" and "credit issuers" are interchangeable with "debit products" and "debit issuers". Still further, and as used throughout the following specification, the "credit issuer" may be a credit card company, a payment services system, a payment company, an electronic payment company, etc. In general, it is the credit issuer that supplies the credit product to the consumer, which credit product is used in a credit-based transaction, whether online (in the networked environment N), over the telephone or at a physical point-of-sale. Various embodiments of the presently-invented system 10 are illustrated in schematic form in FIGS. 1-4.

Figure 1:
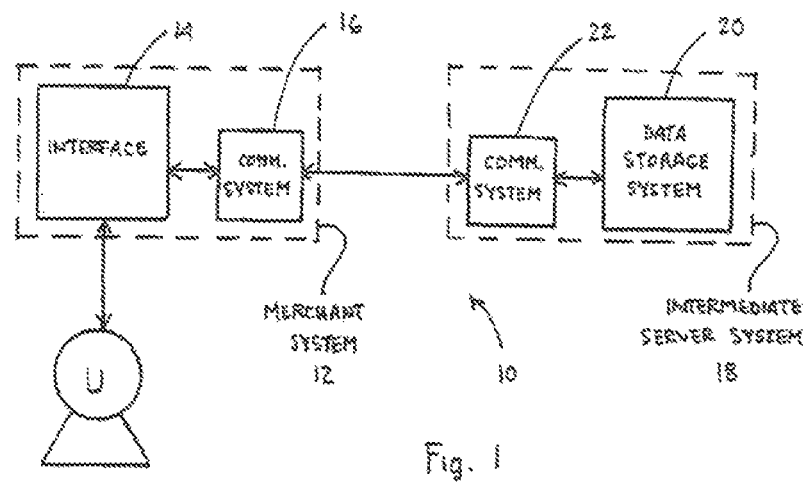
FIG. 1 is a schematic view of one embodiment of a distributed, system for commerce according to the principles of the present invention.

In one preferred and non-limiting embodiment, the system 10 includes a merchant system 12, and this merchant system 12 is provided with a network interface 14 and a communications system 16. Similarly, the system 10 includes an intermediate server system 18, which has a data storage system 20 and a communications system 22. This arrangement and interaction is illustrated in FIG. 1.

The merchant system 12, and in particular the network interface 14 of the merchant system 12, is programmed or otherwise configured to present content 24 to the user U, interact with the user U, accept input data 26 from the user U, etc. Further, and as is known in the art, the communications system 16 facilitates the receipt, processing and transmission of data. Of course, it is also envisioned that the network interface 14 that serves content 24 to the user U and accepts input data from the user U may be provided by the intermediate server system 12 directly to the user U (bypassing the merchant system 12). Similarly, this network interface 14 may be provided to the user from the credit issuer or other system directly to the user U or through the intermediate server system 12.

The intermediate server system 18 is in communication with the merchant system 12. The data storage system 20 of the intermediate server system 18 allows for the storage of data transmitted to the intermediate server system 18. In addition, and as discussed above in connection with the communications system 16 of the merchant system, the communications system 22 of the intermediate server system 18 also facilitates the receipt, processing and transmission of data. Accordingly, the communications systems 16, 22 allow for the appropriate communication of data between the merchant system 12 and the intermediate server system 18. Any means of communication is envisioned, and wireless platforms are used when the present invention is operating in the networked environment N. For example the communications may be over a network, over the Internet, over a networked system of computers, over a virtual private network, secured communications, etc. Any effective manner of transmitting, processing and receiving data is envisioned.

In operation, the user U engages with the merchant system 12 via the network interface 14. The network interface 14 may be interactive, thereby allowing content 24 to be displayed to the user U, as well as accepting input data 26 from the user U. This content 24 may take many forms. In one preferred embodiment, the content 24 presented to the user includes: terms relating to a credit product; conditions relating to a credit product; card member agreement data; credit product offer data; credit issuer data; application data; credit issuer description data; credit product description data; explanation data; advertisement data; promotional data; banner data; hyperlink data; transactional data; checkout data; user data; credit issuer data; merchant data; authorization data; permission data; payment data; transaction-specific data; identification data; network data; processing data; settlement data payment data, etc. Accordingly, the content 24 presented to the user U may take a variety of forms that allow for the successful interaction and transaction between the user U, the merchant system 12, a credit issuer or some other network system in the networked environment N, e.g., the payment process (as discussed hereinafter).

Figure 2:
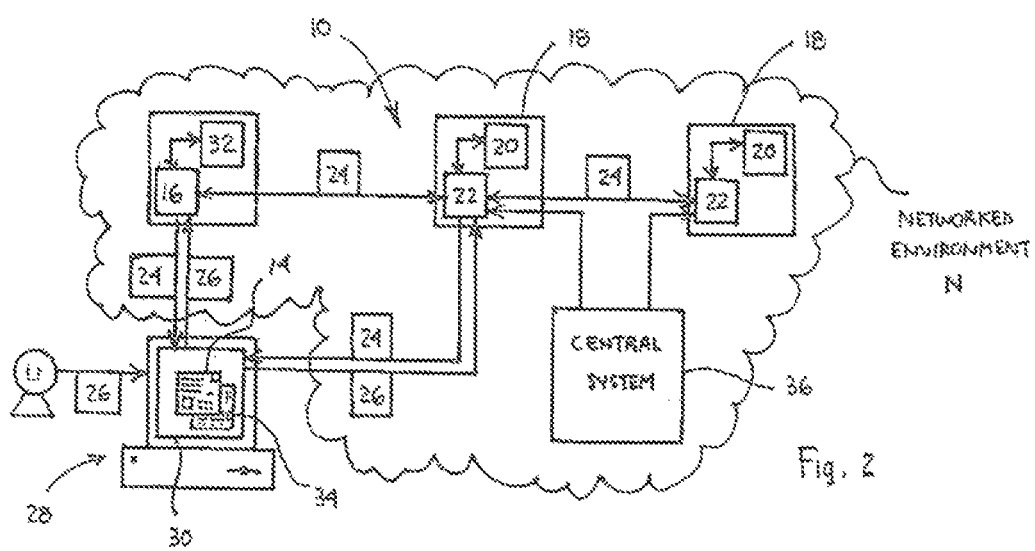
FIG. 2 is a schematic view of another embodiment of a distributed system for commerce according to the principles of the present invention.

As illustrated in the preferred and non-limiting embodiment of FIG. 2, the user U engages with or otherwise operates a computer 28, which includes a presentation device 30, such as a computer monitor and the like. Accordingly, the network interface 14 is providing content 24 to the user U on the presentation device 30. Further, in this embodiment, the merchant system 12 is in the form of an online location or website that either presents or distributes the content 24 to the user U on the user's presentation device 30.

In addition, and as illustrated in FIG. 2, the user U provides input data 26 to the computer 28, and this input data 26 is saved on a data storage system 32 of the merchant system 12. In addition, this input data 26 may also be provided directly to the data storage system 20 of the intermediate server system 18. Still further, this input data 26 may be transmitted directly from the merchant system 12 to another system, e.g., a credit issuer, a payment company, an electronic payment company, a third-party data collection system, etc. In addition, the input data 26 may be routed through the intermediate server system 12 to another system for storage. In a still further embodiment, the input data 26 of the user U is transmitted directly to the intermediate server system 12 or some other system, e.g., the credit issuer system.

The content 24 in one embodiment is transmitted from the intermediate server system 18 to the merchant system 12, and this content 24 is then served and presented to the user U directly by the merchant system 12 on the user's presentation device 30. Further, this content 24 may be transmitted on a periodic basis, a dynamic basis, a request basis, etc. This means that the content 24 may be transmitted to the data storage system 32 of the merchant system 12 on some set basis, as the content 24 changes and/or when the merchant system 12 requests this content 24. Accordingly, in this embodiment, the content 24 is stored on the merchant system 12.

In order to ensure the integrity of the content 24 provided from the intermediate server system 18 to the merchant system 12, this content 24 (or data) may be updated, modified, certified, deleted and/or monitored by the intermediate server system 18, or alternatively by some other system, e.g., the payment processor, the credit issuer, a third-party application service provider, etc. Accordingly, the intermediate server system 18 is capable of monitoring the content 24 resident on the data storage system 20 of the merchant system 12, and can thus ensure that this content 24 provided to the user U is appropriate and fully accurate.

In another preferred and non-limiting embodiment, and as also illustrated in FIG. 2, the content 24 may be simply referenced by the merchant system 12 at a location on the intermediate server system 18, in particular, at a specified location on the data storage system 20 of the intermediate server system 18. In this manner, the content 24 would be served by the intermediate server system 18 directly to the user U on the user's presentation device 30, such as on the network interface 14 or in some other similar manner. Still further, the user U may be redirected to an intermediate server system interface 34. As with the network interface 14 of the merchant system 12, in this embodiment, the intermediate server system interface 34 would also be programmed or configured to present content 24 to the user U, interact with the user U, accept input data 26 from the user U, etc.

When the merchant system 12 either references the content 24 on the intermediate server system 18, or uses the intermediate server system interface 34 to receive the content 24, as discussed above, this content 24 may be updated on a periodic basis, dynamic basis, request basis, etc. In particular, this content 24 would be updated on the data storage system 20 of the intermediate server system 18 by some third-party control system, referred to as a central system 36. Therefore, the central system 36 maintains ultimate control over data integrity, as well as the makeup and accuracy of the content 24 provided to the user U.

In addition, such arrangement is especially useful when multiple intermediate server systems 18 are used for distributing this content 24 to a large number and wide variety of users U. All of the individual intermediate server systems 18 may also be in communication with each other via the communications system 22, or may only be in communication with the central system 36. In either case, the user U is provided with the relevant content 24 through the most appropriate intermediate server system 18, e.g., the nearest location, the fastest connection, etc. In addition, such an arrangement allows for the utmost control of the content 24. As discussed, and in one preferred embodiment, the content 24 is displayed in response to a user-selected hyperlink presented on a page of a merchant online location, e.g., a website, etc.

As discussed above, the presently-invented system is useful in connection with credit-based and debit-based transactions, such as in an online, networked environment N. In some instances, the credit issuer (or payment company) must mediate the transactions that utilize the credit issuer's credit products, and this mediation requires some direct path between the merchant system 12 and the credit issuer. This mediation often leads to the various drawbacks discussed above. To overcome these drawbacks, and as previously discussed, the presently-invented system 10 serves to leverage the merchant's existing investment in distributed content 24 delivery by extending the use of the existing merchant content 24 delivery infrastructure, and by allowing it to also serve as a direct connection into the credit issuer for the customer or user U.

According to the prior art, the merchant may distribute their content throughout a global network of web servers maintained by a network provider. When a user accesses the merchant's content, they are automatically routed to the closest web server to their personal computer, and therefore, the speed of delivery is maximized, and the customer experience is enhanced. Another benefit to the merchant is that this distributed system reduces the merchant's need to design their internal server capacity to handle peaks in usage. Because a portion of the shopping experience is offloaded to the distributed network, there is no need for the merchant to support this portion of the usage with internal resources. Should the customer fill the shopping cart and make a purchase, the user is transferred to the merchant's secure servers and the purchase is completed As discussed above, the presently-invented system 10 enhances this distributed content concept to serve as the platform for the payment step of the merchant's checkout process. According to the present invention, the content delivery system (intermediate server system 18) delivers the appropriate web forms to complete the checkout process, i.e., the forms associated with the permission step of the transaction, and the user information is sent directly to the credit issuer, where it is further separated into useable data sets (as discussed hereinafter), and further routed to a payment processor and the credit issuer's internal processing platform. The advantages to the merchant and credit issuer using this solution include enhanced security, as customer personal information and authentication credentials are not collected or stored within the merchant's system (no chance for data breach), and low cost of implementation, i.e., this distributed content model in used by retailers by distributing the payment interface onto an existing, distributed and global platform.

The present system 10 is particularly useful in connection with commercial transactions. Accordingly, the merchant system 12 (and/or the user U) transmits transactional data 38 to the intermediate server system 18. The intermediate server system 18 is programmed or configured to receive, process and/or transmit this transactional data 38 to other systems in the networked environment N. While the transactional data 38 may take many forms and formats, in one embodiment, the transactional data 38 may include user data, credit issuer data, merchant data, authorization data, payment data, transaction-specific data, identification data, network data, processing data, settlement data, etc. Accordingly, the transactional data 38 generated by the user U, the merchant, the credit issuer, etc. is transmitted over and distributed over the distributed system 10 of the present invention, specifically through the intermediate server systems 18.

As discussed above in connection with the prior art, there exists many payment processors, which serve to facilitate credit-based or debit-based transactions between users U and merchants using a credit or debit product of an issuer. In particular, the payment processors have payment processor systems 40 that serve to dictate the form and format of the transactional data 38 provided to the payment processor system 40 for use in consummating these credit-based or debit-based transactions. However, as seen in FIG. 3, by using the intermediate server system 18, the payment processor system 40 is dis-intermediated from the merchant system 12.

In particular, and in one preferred and non-limiting embodiment, the transactional data 38 is provided by the user U to the merchant system 12 via the computer 28. This transactional data 38 includes a plurality of data points 42, which are provided to the intermediate server system 18 by the merchant system 12. However, in operation, the intermediate server system 18 may transmit only a portion of the transactional data 38, i.e., only certain data points 42, to the payment processor system 40 for use in completing the transaction, such as accepting requests and providing authorization. Still further, this portion of transactional data 38 provided to the payment processor system 40 may be placed in or formatted in a predetermined manner prior to transmission to the payment processor system 40. Therefore, the payment processor system 40 still receives the appropriate transactional data 38 in the appropriate form and format for completing the credit-based or debit-based transaction. Further, the payment processor system 40 is capable of transmitting transactional data 38 through the intermediate server system 18, the merchant system 12, etc. In this manner, the credit-based or debit-based transaction is appropriately completed.

Figure 3:
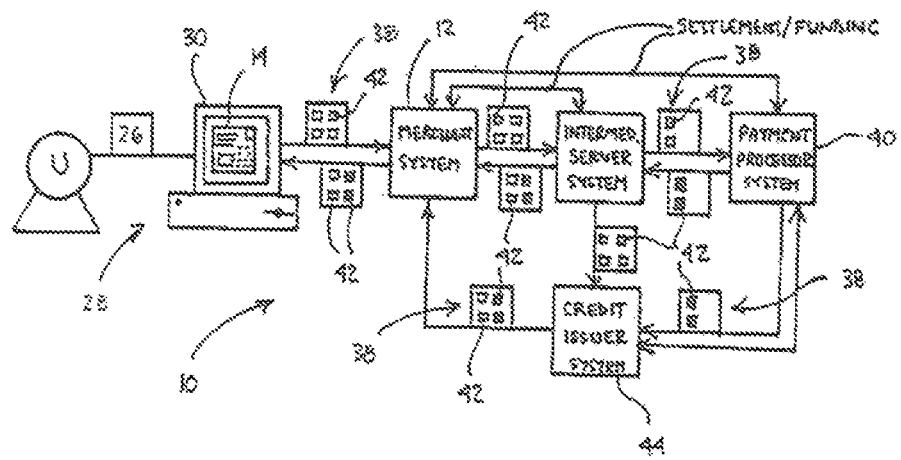
FIG. 3 is a schematic view of a still further embodiment of a distributed system for commerce according to the principles of the present invention.

In a further embodiment, and as illustrated in FIG. 3, the system 10 may also include a credit issuer system 44. This credit issuer system 44 is capable of receiving, processing and/or transmitting data, and the intermediate server system 18 is in communication with the credit issuer system 44 within the networked environment N. In particular, the intermediate server system 18 and credit issuer system 44 are capable of communicating appropriate transactional data 38 therebetween.

In this embodiment, this transactional data 38 may include input data 26, user U data, credit issuer data, merchant data, authorization data, payment data, transaction-specific data, identification data, network data, processing data, settlement data, etc. In the preferred embodiment of FIG. 3, all of the data points 42, i.e., all of the transaction data 38, is communicated by the intermediate server system 18 to the credit issuer system 44. Therefore, while only a portion of this transactional data 38 is provided to the payment processor system 40, all data is provided to the credit issuer system 44. In a still further embodiment, only a portion of the data points 42 is transmitted to the credit issuer system, and the full set of transaction data is built by the intermediate server system 12 using the data returned from the credit issuer system 44 and the payment processor system 40.

After processing the data (such as authorizing the credit-based transaction), the payment processor system 40 may provide appropriate transactional data 38, e.g., fulfillment, payment or settlement data, directly to the credit issuer system 44 or to the credit issuer system 44 via the intermediate server system 18. Once either the intermediate server system 18 and/or the credit issuer system 44 receives the transactional data 38 from the payment processor system 40, this, data is recombined or otherwise matched with the appropriate and full set of transactional data 38. Either one or both of the intermediate server system 18 and the credit issuer system 44 may include the appropriate algorithms to match the transactions' and ensure full integration of the data points 42 received from all systems 12, 18, 40, 44. Accordingly, all of the relevant systems are receiving the appropriate data in the appropriate form and format based upon the seamless communication and operating features of the presently-invented system 10.

In one specific example of this "disintermediation" of the payment processor system 40, an example of some data that the payment processor system 40 does not desire to receive or use would be small business data, gift card information, enumeration data, loyalty information, new consumer data, etc. Therefore; while such transactional data 38 may be useful to the credit issuer or merchant, only a small portion related to the specific transaction is of interest to the payment processor system 40. Therefore, the entire set of transactional data is analyzed by the intermediate server system 18, and only a portion extracted for communication to the payment processor system 40.

In one example, the full data set (100%) of transactional data 38 is sent to the intermediate server system 18. The intermediate server system 18 then analyzes this transactional data 38 and extracts a partial set (60%), which includes data required by the payment processor system 40. This partial set of data (60%) is appropriately formatted and forwarded to the payment processor system 40, while the full data set (100%) is sent to the credit issuer system 44. The payment processor system 40 receives the formatted data (60%), which would appear to be a processing request from the merchant via the credit issuer. The payment processor system 40 would then authorize the transaction and send the authorization to the credit issuer system 44 based upon the partial data set (60%). The credit issuer system 44 could then match the partial data set (60%) with the full data set (100%) on a transaction-by-transaction basis, and the full transaction would then be authorized, appended and communicated back to the merchant. In this manner, the commercial transaction, and specifically a credit-based or debit-based commercial transaction, is appropriately facilitated and all parties are able to use a variety of desired data points 42, while receiving only specified data points 42 needed to process the transaction.

In another example of the presently-invented system 10, and according to the prior art, it has been recognized that all present electronic payment options supported by the payment processors application programming interfaces (API) were composed of two parts: a permission transaction loop and a financial settlement transaction loop. The permission loop is defined by a message that contains an account or customer identifier, a merchant identifier, a transaction amount, a transaction date, a payment type and a permission or approval code. These fields are core to all payment types and always occur within the permission transaction loop. The financial settlement transaction loop is defined by a message that contains an account identifier, merchant identifier, a transaction amount, a transaction date, a payment type, a permission or approval code and a description field. Since these two parts are present for all payment options, they are referred to as a common feature data set, which represents the portion of the API that is constant across all payment options within a payment processor's API.

There exists a second part of the payment option API, which may be referred to as a variable feature data set. This portion of the API represents the features of the payment option that are unique to a specific payment option. The variable feature data set represents the specifics of the payment method within the API. For example, a CVV code in a Visa authorization is Visa's specific implementation of a device authentication code that is unique to their payment option. Similarly, a PIN code in a debit card transaction is a user authentication code specific to the debit card authorization transaction. Separation of the payment processor API into a common feature data set and a variable feature data set creates the opportunity to abstract the variable feature data set from the payment processor API, and minimize or even eliminate the need for the payment processor to make significant changes to support a new payment option by limiting the payment processor's role to handling the common feature data set only. Accordingly, the present invention allows for a significantly faster delivery and implementation of new payment options, at a far lower cost to the credit issuer.

In another embodiment, the credit issuer system 44 and/or the intermediate server system 18 may be provided with additional functionality in order to facilitate the transaction. For example, such functions may include authenticating the user U, verifying the user U, approving or denying a user U application, verifying a transaction, processing user data, processing merchant data, processing credit (or debit) issuer data, processing transactional data 38, processing credit or debit product data, etc. Therefore, a full range of functionality is provided to facilitate and transact a variety of credit-based or debit-based transactions.

As discussed above, the merchant system 12 may take many forms. For example, the merchant system 12 may be an online location, a merchant web page, a merchant call center, a merchant settlement system, etc. In any case, the merchant system 12 is in communication with the intermediate server system 18, and may also be in communication with the payment processor system 40 and credit issuer system 44. In addition, the above-discussed content 24 may be presented or provided to the user U prior to a transaction, during the transaction or after the transaction. Still further, the content 24 may be presented to the user U in a variety of forms. For example, this content 24 may be presented in the form of a web page, an electronic document, a window, a pop-up window, etc. In any of these forms, various transactional data 38, data points 42 (or fields), content 24 or other information or data is provided to the user U.

As discussed, the network interface 14 of the merchant system 12 may be presented to the user U on the presentation device 30 of the user U. In addition, this network interface 14 (or the intermediate server system interface 34) may be interactive, such that a variety of data fields and points may be displayed to the user U, and the input data 26 accepted.

In one embodiment, the content 24 presented to the user U may be interest rate data, credit limit data, purchase data, charge data, cost data, expense data, annual fee data, interest accrual data, statement data, account data, fund advancement data, transfer data, delinquency data, payment term data, account review data, credit product data, credit issuer data, contract data, liability data, certification data, privacy data, personal information, use data, collected information data, consent data, foreign data, access data, online service data, phone service data, liability data, representation data, warranty data, termination data, indemnity data, term variation data, communication data, assignment data, rights data, governing law data, or any combination thereof.

In addition, in this embodiment, the input data 26 may include user identification, a PIN, a name, a consumer key, a consumer identification, an account number, an address, a city, a state, a zip code, a country, a telephone number, an e-mail address, a social security number, a date of birth, the merchant's name, an identification, an order number, an authorization number, an authorization time, an authorization amount, a ship-to address, a bill-to address, a transaction amount, a consumer purchase demographic, a transaction date, a transaction type, a product identification, a service identification, shipping costs, delivery type, consumer type, a company identity, a merchant identity, previous transaction data, geographical data, credit account data, bankcard balance data, delinquency data, credit segment data, previous transaction data, time between transactions data, previous transaction amount, previous transaction approval status, previous transaction time stamp data, a response code, consumer payment method, consumer payment history, consumer account history, consumer credit account balance, income data, family data, employment data, relationship data, expense data, application data, acknowledgement data, selection data, choice data, or any combination thereof.

In many instances, the central system 36 (typically in the form of the credit issuer system 44) may already have on hand specific data that can be used to pre-populate various screens or input fields of the user U at the network interface 14 and/or intermediate server system interface 34. Accordingly, such data may be stored at the credit issuer system, or otherwise stored on the data storage system 20 of the intermediate server system 18. Therefore, the user U would not need to continually retype his or her information into the appropriate interface 14, 34, and instead, the data would be pre-populated to the extent possible.

In another preferred and non-limiting embodiment, the content 24 is in the form of an offer of one or more credit products to the user U. In this embodiment, the input data 26 may be directed to this offer. Therefore, the user U is presented with: terms of the credit product; conditions of the credit product; an account agreement; explanation data; promotional data, etc. For example, the user U may choose to use a specific credit product that he or she does not currently own, such that an application for this credit product is provided to the user U on the network interface 14 and/or intermediate server system interface 34.

Accordingly, and as discussed above, all the data relating to the application, the terms, the conditions, etc. are provided to the user U either by the merchant system 12, the intermediate server system 18, or some reference or hyperlink between the systems 12, 18. This will ensure that the most appropriate application, terms, conditions, card member agreement, explanation data, promotional data, etc. is provided to the user U, and this data is up-to-date and applicable. This further allows the credit issuer system 44 to be in control of this information and data, which ensures data integrity. Therefore, this process and system 10 increases merchant/creditor trust, reduces redundancy, etc. In particular, this goal is achieved through the intermediate and established network of servers or server system 18 capable of serving the appropriate content 24, serving web forms, serving dynamic terms and conditions, serving checkout information, etc.

In one embodiment, the input data 26 provided by the user U may include acknowledgement data from the user U, and further content 24 provided to the user U is a credit product application. Next, the user U provides input data 26 in the form of application input data, which is transmitted to the intermediate server system 18 and/or the credit issuer system 44. Once received, the intermediate server system 18 and/or credit issuer system 44 is programmed or configured to approve or deny an application by the user U for the credit product based at least in part upon the input data 26 provided by the user U. If approved, an account may be opened and established for the user U for the credit product of the credit issuer, and, if denied, denial data may be transmitted to the user U. Due to the dynamic nature of this process, the user U may use the approved credit product in connection with the transaction that may already be underway. In making the decision of whether to approve or deny the application for the credit product, consumer risk data may be determined based upon the input data 26 of the user U, the acknowledgment data, the application input data, etc.

Figure 4:
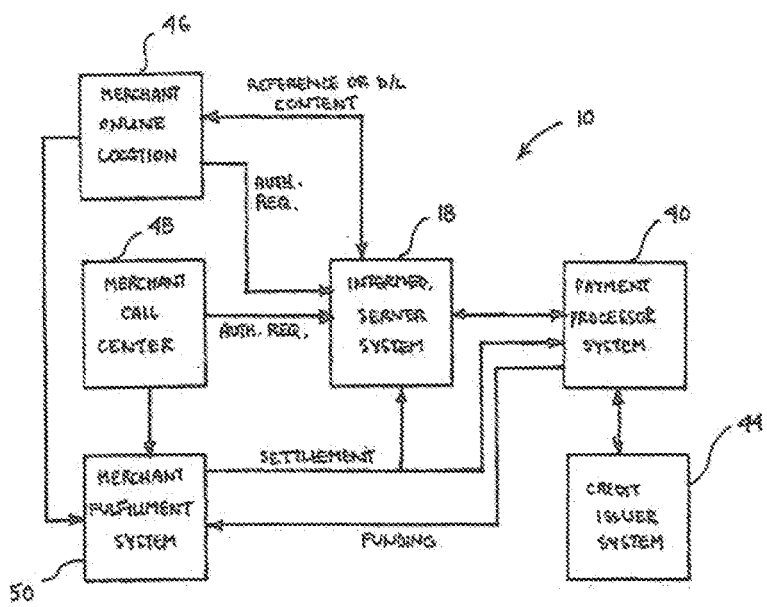
FIG. 4 is a schematic view of another embodiment of a distributed system for commerce according to the principles of the present invention.

One specific example of the system 10 of the present invention is illustrated in FIG. 4. Specifically, a variety of merchant integration options are provided in the system 10. For example, the content 24 may be downloaded to and served by the merchant system 12. Also, the content 24 may be referenced by the merchant system 12, but directly served to the user U by the intermediate server system 18. With respect to authorization of transactions, the merchant system 12 may send authorization messages directly to the intermediate server system 18. Still further, the merchant system 12 may send authorization messages to the intermediate server system 18 for specific transactions, and redirect the user U to the intermediate server system 18 for other types of transactions.

For example, in one embodiment, the merchant system 12 includes a merchant online location 46, a merchant call center 48 and a merchant fulfillment system 50. In one variation, both the merchant online location 46 and the merchant call center 48 send or transmit authorization requests to the intermediate server system 18, which is in communication with the payment processor system 40. The payment processor system 40 is in communication with the credit issuer system 44. After authorization is provided, these authorized orders are communicated from the merchant online location 46 and the merchant call center 48 to the merchant fulfillment system 50, which provides settlement requests either to the intermediate server system 18 or directly to the payment processor system 40. Finally, the payment processor system 40 funds the transaction with a communication to the merchant fulfillment system 50.

In another level of integration, specific content 24 is downloaded by the merchant system 12 from the data storage system 20 of the intermediate server system 18. This content 24 is served directly to the user U (i.e., at the network interface 14 on the user's browser). Alternatively, the content 24 may be provided directly from the data storage system 20 of the intermediate server system 18 to the user U. One benefit of such interaction is that the merchant does not need to handle any type of consumer regulatory updates. For redirection purposes, the merchant system 12 will be provided with the appropriate URLs for the web content 24, such as the terms and conditions, a What Is? section, FAQs, banners, logos, etc. The merchant system 12 would reference these URLs or establish a process to refresh the content 24 during some periodic maintenance window.

In a further level of integration, the merchant system 12 directly references web content 24 on the intermediate server system 18, and further, sends authorization requests as messages to the intermediate server system 18. However, settlement and funding still occurs directly between the merchant fulfillment system 50 and the payment processor system 40. Accordingly, merchants will create web services requests to the intermediate server system 18 for authorizations in both the merchant online location 46 and the merchant call center 48, as well as for re-authorizations. The intermediate server system 18 would act as the "submitter" on behalf of the merchant to the payment processor system 40.

In yet another level of integration, and as also illustrated in FIG. 4, the merchant system 12 references web content 24 on the intermediate server system 18, and is also sending authorization requests from the merchant call center 48 as messages to the intermediate server system 18. Still further, users U are redirected from the merchant system 12 directly to pages hosted on the intermediate server system 18, such as in the form of an intermediate server system interface 34. Again, all settlement and funding occurs directly between the merchant fulfillment system 50 and the payment processor system 40. Such integration provides a fully optimized transactional experience to the user U. In addition, the merchant system 12 does not need to handle any additional and ancillary transactional data 38. The merchants would not need to build any specific interfaces or pages, as all of this information is provided directly from the intermediate server system 18. In addition, this reduces the compliance checking process and time at the merchant system 12, as the intermediate server system 18 acts as the "submitter" for the merchant to the payment processor system 40. Of course, the merchant call center 48 may also interact directly with the payment processor system 40, as opposed to acting through the intermediate server system 18.

In another example of a commercial transaction occurring through the system 10, the system 10 is also useful in connection with a first-time user U that is shopping anonymously. First, the merchant communicates user U and order information to the intermediate server system 18 using a pc-request web service call. The intermediate server system 18 validates the user U and order data and returns a URL to redirect the user U to a hosted page of the intermediate server system 18. The user U is redirected to a hosted page (or the intermediate server system interface 34) on the intermediate server system 18, where the user U enters authentication information and data, completes any required fields that have not been pre-populated or otherwise enters the appropriate input data 26. The user U then selects to process the transaction. The intermediate server system 18 captures the authentication information and any other required information, processes the authorization request and communicates with the payment processor system 40. The user U will then be redirected to one of multiple URLs provided by the merchant in the pc-request depending upon its success or failure of the authorization. After the user U is redirected to a "success" URL, the merchant system 12 will use the pc-status call to capture the authorization response details for settlement. Accordingly, the merchant system 12 requests and records authorization responses for use in settlement processing, and the intermediate server system 18 returns status responses, which include account numbers and authorization codes for use in this settlement processing procedure.

Another example of the presently-invented system 10 is usable for non-web-enabled systems (e.g., merchant call center 48 and merchant fulfillment system 50), as well as for returning authenticated web users U. The merchant system 12 uses the pc-request with a "process" action code to post the user U and order data to the intermediate server system 18, as well as process any authorization request. The intermediate server system 18 will automatically provide the authorization responses back to the merchant system 12. In this example, the process request transmitted from the merchant system 12 would include the purchase amount, the account number, information about the customer, date of birth, the last four digits of the social security number, merchant customer type, bill-to name/address, ship-to name/address, e-mail address, telephone number, IP address, etc. In addition, information about the transaction, such as shipping costs, product type and channels, would also be included. The response from the intermediate server system 18 would be in the form of a standard credit card response, and utilize standard response codes and authorization control codes. In addition, the actual 16-digit account number would also be transmitted.

The authorization requests and messages may take a variety of forms and formats. For example, a merchant order number may be set and used during the submission process. This merchant order number would carry through to the intermediate server system 18 and the payment processor system 40. In addition, the merchant order number may be useful in communication with the credit issuer system 44 regarding the transaction. Still further, this merchant order number can be used for authorization add-ons, where a user U contacts the merchant after an order has been placed to add additional items to the order.

A set of business rules may be used to optimize the performance of the intermediate server system 18, as well as the overall system 10. In particular, three different web service calls may be used in connection with authorizations and status. The pc-request call with the action code of "set" allows the merchant to post the user U and order information. A pc-commit call allows the merchant to request that the information in the pc-request call now be processed for an authorization. The pc-request call with an action code of "process" allows the merchant to submit the user U and order information and process the request for the authorization in the same transaction. A pc-status call may be used by the merchant for requesting the current status of an authorization request that has already been processed. For example, Table 1 illustrates various standard fields used in connection with the pc-request function.

TABLE 1

| Field Name | Required based on action-code | Format | PC Usage |
|---|---|---|---|
| Standard fields which could be passed on all pc-request transactions regardless of Method of Payment | | | |
| pc-version | ALL | A/N(8) | System Version. Defined value |
| method-of-payment | ALL | A/N(2) | Method of Payment = BL, PA or BB to be use by Payment Processor. |
| product-type | ALL | A/N(2) | "BL" for BML, "PA" for Preferred account or "BB" for Business Products |
| production-indicator | ALL | A/N(5) | TRUE/FALSE Used to verify transaction environment destination. Must use corresponding URLs |
| merchant-group-id | ALL | N(10) | Simple key to identify merchant could be first 10 digits of M/D with leading 0's. Defined value |
| action-code | ALL | A/N(20) | SET/PROCESS |
| sub-action | ALL | A/N(20) | Constant - AUTH |
| pc-success-url | SET | A/N(200) | Used to redirect customer if authorization was successful. Merchant generated. |
| pc-failure-url | SET | A/N(200) | Used to redirect customer if authorization was not successful. Will usually be the payment option selection page. Merchant generated. |
| pc-interim-url | Optional (See PC Usage) | A/N(200) | Used to specify interim pages for certain processing approaches such as a confirmation page. Merchant generated. |
| pc-error-url | SET | A/N(200) | Used to redirect customer before the input screen is presented if an error condition is detected. Merchant generated. |
| pc-update-info-url | Optional (See PC Usage) | A/N(200) | Used to redirect the customer if they choose to update their address on the hosted page. Merchant generated. |
| pc-choose-other-mop-url | SET | A/N(200 | Used to specify the redirect if the customer chooses to go back to the payment options screen while sitting on the page. Merchant generated. |
| pc-favicon-url | Optional (See PC Usage) | A/N(200) | |
| pc-css-stylesheet-url | Optional (See PC Usage) | A/N(200) | |
| soft-error-threshold | Optional (See PC Usage) | N(1) | Allows merchant to override the default of count of 3 for soft errors to allow customers to resubmit failed PC app. |
| payment-division | ALL | N(10) | This is the Payment Processor Division. |
| pc-merchant-id | ALL | N(15) | Value used for Pricing, Terms, Merchant Settings. Defined value. |
| merchant-order-number | Optional (See PC Usage) | A/N(22) | A unique customer order number that is typically used for reconciliation purposes. (NOTE: Will be generated by PC if left blank), Merchant generated. |
| customer-authenticated-by-merchant | Optional (See PC Usage) | A/N(5) | TRUE/FALSE Flag that customer has logged into the merchant site successfully. |
| account-number | Optional (See PC Usage) | N(16) | Merchant can pass the Account number if they have it. The merchant should pass a blank if they do not have it and the default account will be generated by PC. |
| authorization-amount | ALL | N(10v2) | Total amount of authorization including shipping and handling, taxes and special fees. Grand total for the order. |
| channel-indicator | ALL | A/N(1) | W—Web, C—Call Center, M—Mail, R—Retail, O—Other. Web is default. Use Other for reauth only. |

TABLE 1-continued

| Field Name | Required based on action-code | Format | PC Usage |
|---|---|---|---|
| bank-office-indicator | ALL | A/N(5) | TRUE/FALSE should be TRUE on authorizations that are sent from fulfillment system. |
| term-and-conditions-code | ALL | N(5) | Merchant will pass one of two values based on the sales channel. Defined value. |
| customer-registration-date | ALL | Date YYYY-MM-DD | Customer original registration date. If not registered or new to the site, use the current date. |
| delivery-method | ALL | A/N(3) | Indicates how the majority of the product in the order was delivered. Valid values are: PHY—Physical, DIG—Digital, SVC—Service, CNC—Cash and Carry |
| shipping-amount | Optional (See PC Usage) | N(6v2) | Required if PHY delivery method. |
| st-equals-bt-name-indicator | Optional (See PC Usage) | A/N(5) | TRUE/FALSE |
| ship-to-name | Optional (See PC Usage) | A/N(30) | Required if PHY delivery method and ST = BT-Name-Indicator not equal TRUE |
| st-equals-bt-name-indicator | Optional (See PC Usage) | A/N(5) | TRUE/FALSE |
| ship-to-name | Optional (See PC Usage) | A/N(30) | Required if PHY delivery method and ST = BT-Address-Indicator not equal TRUE |
| st-equals-bt-address-indicator | Optional (See PC Usage) | A/N(5) | TRUE/FALSE |
| ship-to-address-1 | Optional (See PC Usage) | A/N(30) | Required if PHY delivery method and ST = BT-Address-Indicator not equal TRUE |
| ship-to-address-2 | Optional (See PC Usage) | A/N(30) | Required if PHY delivery method and ST = BT-Address-Indicator not equal TRUE |
| ship-to-city | Optional (See PC Usage) | A/N(30) | Required if PHY delivery method and ST = BT-Address-Indicator not equal TRUE |
| ship-to-state | Optional (See PC Usage) | A/N(30) | Required if PHY delivery method and ST = BT-Address-Indicator not equal TRUE For US states and territories use standard two character abbreviation. |
| ship-to-postal-code | Optional (See PC Usage) | A/N(30) | Required if PHY delivery method and ST = BT-Address-rndicator not equal TRUE |
| ship-to-country | Optional (See PC Usage) | A/N(2) | Required if PHY delivery method and ST = BT-Address-Indicator not equal TRUE |
| ship-to-phone | PROCESS | A/N(14) | AAAEEENNNNXXXX where A = Area code, E = Exchange, N = Number. An extension number XXXX can be passed or leave it blank. |
| customer-ip-address | PROCESS | A/N(15) | Customer's IP Address. (NOTE: this should be blank if authorization is originating from the Call Center or Retail channels. |
| alternate-ip-address | Optional (See PC Usage) | A/N(15) | This may be required in certain cases. |
| customer-type | ALL | A/N(1) | Indicator of whether the customer is a new or returning customer for the merchant. Values: N—New to the merchant E—Existing customer at the merchant |
| item-category | ALL | N(4) | General categorization of the most expensive extended item cost in the shopping basket |
| pre-approval-invitation-number | Optional (See PC Usage) | N(16) | Use used when the order has been pre-approved, either internally or externally |
| mag-stripe-data | Optional (See PC Usage) | A/N(39) | Data from magnetic card stripe |
| virtual-authentication- | Optional (See PC | N(4) | Security code from card - such as |

TABLE 1-continued

| Field Name | Required based on action-code | Format | PC Usage |
|---|---|---|---|
| key | Usage) | | CCV |
| expiration-date | Optional (See PC Usage) | MMYYYY | Expiration date from card |
| merchant-promotional-code | Optional (See PC Usage) | A/N(4) | For future use |
| merchant-reference-id | Optional (See PC Usage) | A/N(22) | Transaction reference ID set by the merchant and echoed back on the response. |
| split-tender-indicator | Optional (See PC Usage) | A/N(5) | TRUE/FALSE Used to indicate that there is a split payment on this authorization. |
| Preferred Account Fields | | | |
| bill-to-name | ALL | A/N(60) | |
| bill-to-address-1 | ALL | A/N(30) | |
| bill-to-address-2 | Optional (See PC Usage) | A/N(30) | |
| bill-to-city | ALL | A/N(30) | |
| bill-to-state | ALL | A/N(30) | For US states and territories use standard two character abbreviation. |
| bill-to-postal-code | ALL | A/N(30) | Bill to zip code. Left justify, space fill. |
| bill-to-country | ALL | A/N(2) | |
| bill-to-email-address | ALL | A/N(50 | This field is required by BML for all web transactions and should be requested in all call center transactions if possible. |
| bill-to-phone | ALL | A/N(10) | Use format AAAEEENNNN where A = Area code, E = Exchange, N = Number. Do not capture or pass an extension number |
| bill-to-ssn | PROCESS | N(9) | Last four for MOP Full for SSN for PA MOP Pre-fill with leading zeros if only sending last four |
| bill-to-date-of-birth | PROCESS | Date YYYY-MM-DD | |
| Preferred Account Only Fields - The values below should be sent if already known by the merchant | | | |
| work-phone | PROCESS | A/N(14) | AAAEEENNNNXXXX where A = Area code, E = Exchange, N = Number. An extension number XXXX can be passed or leave it blank. |
| employer-name | PROCESS | A/N(20) | |
| annual-income | PROCESS | N(8)v2 | |
| currency-name | PROCESS | A/N(3) | |
| residence-status | PROCESS | A(1) | |
| years-at-residence | PROCESS | N(2) | |
| years-at-employer | PROCESS | N(2) | |
| checking-account-indicator | PROCESS | A/N(5) | |
| savings-account-indicator | PROCESS | A/N(5) | |
| secret-question-code | Optional (See PC Usage) | A/N(2) | |
| secret-answer | Optional (See PC Usage) | A/N(25) | |
| Business-Level Only Fields - The values below should be sent if already known by the merchant | | | |
| business-legal-name | PROCESS | A/N(20) | |
| dba-name | PROCESS | A/N(35) | |
| business-address-1 | PROCESS | A/N(30) | |
| business-address-2 | Optional (See PC Usage column) | A/N(30) | |
| business-city | PROCESS | A/N(30) | |
| business-state | PROCESS | A/N(30) | For US states and territories use standard two character abbreviation |
| business-postal-code | PROCESS | A/N(30) | |
| business-main-telephone-number | PROCESS | N(10) | |
| user-id | PROCESS | A/N(50) | |
| pin | PROCESS | A/N(24) | |
| administrator-name | PROCESS | A/N(30) | |

TABLE 1-continued

| Field Name | Required based on action-code | Format | PC Usage |
|---|---|---|---|
| administrator-phone | PROCESS | N(14) | AAAEEENNNNXXXX where A = Area code, E = Exchange, N = Number. An extension number XXXX can be passed or leave it blank. |
| administrator-fax | PROCESS | N(14) | AAAEEENNNNXXXX where A = Area code, E = Exchange, N = Number. An extension number XXXX can be passed or leave it blank. |
| administrator-email | PROCESS | A/N(50) | |
| administrator-title | PROCESS | A/N(10) | |
| supervisor-name | PROCESS | A/N(30) | |
| supervisor-email-address | PROCESS | A/N(50) | |
| business-d-and-b-number | PROCESS | A/N(9) | |
| business-tax-id | PROCESS | N(9) | |
| business-naics-code | PROCESS | A/N(6) | |
| business-type | PROCESS | A/N(3) | Company Type Field Includes: Corporation Partnership Sole Proprietor S Corp LLC LLP Non-Profit Government School Other |
| business-years-in-business | PROCESS | A/N(3) | 0 1 2 3 4 5 6 7 8 9 10+ |
| business-number-of-employees | PROCESS | A/N(3) | 0 1-5 6-20 21-100 101-200 201-800 800+ |
| pg-last-name | Optional (See PC Usage) | A/N(35) | All of the Personal Guarantor information is required for Sole Proprietorships and Partnerships and may be requested based on other factors |
| pg-first-name | Optional (See PC Usage) | A/N(35) | |
| pg-ssn | Optional (See PC Usage) | A/N(9) | |
| pg-dob | Optional (See PC Usage) | Date YYYY-MM-DD | |
| pg-income-currency-type | Optional (See PC Usage) | A/N(3) | |
| pg-annual-income | Optional (See PC Usage) | N(8)v2 | |
| pg-residence-status | Optional (See PC Usage) | A(1) | |
| pg-checking-indicator | Optional (See PC Usage) | A(1) | |
| pg-savings-indicator | Optional (See PC Usage) | A(1) | |
| pg-years-at-employer | Optional (See PC Usage) | N(2) | |
| pg-years-at-residence | Optional (See PC Usage) | N(2) | |
| pg-home-address-1 | Optional (See PC Usage) | A/N(30) | |
| pg-home-address-2 | Optional (See PC Usage) | A/N(30) | |

TABLE 1-continued

| Field Name | Required based on action-code | Format | PC Usage |
|---|---|---|---|
| pg-home-city | Optional (See PC Usage) | A/N(30) | |
| pg-home-state | Optional (See PC Usage) | A/N(30) | For US states and territories use standard two character abbreviation |
| pg-home-postal-code | Optional (See PC Usage) | A/N(30) | |
| pg-email-address | Optional (See PC Usage) | A/N(50) | |
| pg-home-phone-number | Optional (See PC Usage) | N(14) | |
| pg-title | Optional (See PC Usage) | A/N(10) | Required for Sole Proprietorships and may be requested based on other factors Principal Officer CEO CFO President Partner N/A |

As discussed, the pc-commit call is used when the merchant wants to process a request that was previously submitted via the pc-request call with the "set" action code. This call may be used if the merchant has a confirmation screen after the hosted page of the intermediate server system 18, but does not want the authorization to get processed until the customer or user U confirms the order on that page. The various field names for the pc-commit call are illustrated in Table 2.

TABLE 2

| PayCapture Field Name | Required | Format | PC Usage |
|---|---|---|---|
| pc-version | ALL | A/N(8) | System Version. Defined value |
| method-of-payment | ALL | A/N(2) | Method of Payment = BL, PA or BB to be use by Payment Processor |
| production-indicator | All | A/N(5) | TRUE/FALSE Used to verify transaction environment destination. Must use corresponding URLs |
| merchant-group-id | ALL | A/N(10) | Simple key to identify merchant could be first 10 digits of MID |
| action-code | ALL | A/N(5) | Constant = PROCESS |
| sub-action | ALL | | Auth, Pre-approve, Score |
| session-key | ALL | Long | Key to existing customer data for operating in confirm mode (What is passed) |
| consumer-ssn | N | N(9) | Last four for MOP Full for SSN for PA MOP Pre-fill with leading zeros if only sending last four |
| consumer-dob | N | Date YYYY-MM-DD | |
| term-and-conditions-code | N | N(5) | Defined Value |
| customer-ip-address | ALL | A/N(15) | Customer's IP Address. (NOTE: this should be blank if authorization is originating from the Call Center or Retail channels. |

Finally, the pc-status request call is used when the merchant needs to get the status of a processed authorization. Normally, such a call is used by merchants to get the authorization response when the authorization is processed at the intermediate server system 18. Table 3 illustrates the various, fields associated with the pc-status call.

TABLE 3

| Field Name | Required | Format | PC Usage |
|---|---|---|---|
| pc-version | ALL | A/N(8) | System Version. Defined value |
| method-of- | ALL | A/N(2) | Method of Payment = BL, PA or |

TABLE 3-continued

| Field Name | Required | Format | PC Usage |
|---|---|---|---|
| payment | | | BB to be use by Payment Processor |
| production-indicator | All | A/N(5) | TRUE/FALSE Used to verify transaction environment destination. Must use corresponding URLs. |
| merchant-group-id | ALL | A/N(10) | Simple key to identify merchant could be first 10 digits of MID |
| action-code | ALL | A/N(20) | Constant = STATUS |
| sub-action | ALL | | Auth, Pre-approve, Score |
| session-key | ALL | A/N(16) | Key to existing customer data for operating in confirm mode |

After an authorization request is taken, the intermediate server system 18 provides an authorization response to the merchant system 12. In one embodiment, a specified account number (e.g., of the credit issuer) should be appended to the order, as well as in the profile of the user U. The account number may be stored with the order in case re-authorization, stand-loan credits or customer service inquiries are required. In addition, the account number would be used in connection with the customer profile for subsequent web purchases. If the user U has a secure login to the merchant online location 46, the merchant may take advantage of the "authenticated" authorization format to allow a one-click purchase process. Table 4 illustrates the various fields that may be used in connection with a variety of payment, methods and for use in authorizing the transaction.

TABLE 4

| Field Name | Format | Usage |
|---|---|---|
| Standard fields which could be returned on all pc-status-request transactions regardless of Method of Payment | | |
| session-key | A/N(16) | Handle to customer data persisted on PC handler |
| system-status | A/N(1) | Used to indicate if system is processing normally. |
| response-text | A/N(200) | |
| authorization-id | Long | Internal use only |
| authorization-code | A/N(6) | This required for settlement |
| authorization-response-code | N(3) | Numeric value indicating approval or decline. |
| authorization-sub-code | N(3) | |
| account-number | N(16) | |
| merchant-order-number | A/N(22) | A unique customer order number that is typically used for reconciliation purposes. (NOTE: Will be generated by PC if left blank), Merchant generated. |
| merchant-reference-id | A/N(22) | Transaction reference ID set by the merchant and echoed back on the response |
| redirect-or-child-url | A/N(200) | |
| Standard fields which could be returned for Preferred Accounts and Business-Level Method of Payments | | |
| requested-amount | N(10).99 | |
| credit-line | N(10).99 | |
| approved-amount | N(10).99 | |
| approved-terms | A/N(8) | |
| processing-indicators | A/N(8) | |
| marketing-promotion | A/N(8) | |
| address-indicator | A/N(4) | |
| expiration-date | N(4) | |

Finally, Table 5 illustrates various suggested response codes and actions that the merchant should take for each code.

TABLE 5

| Response Code | Description | Action Taken | Error Message | Operations Action |
|---|---|---|---|---|
| Default (if not listed below) | N/A | Return user to Page, allow 3 attempts to use account before removing credit product as an option | Credit Issuer was unable to authorize your transaction. Please verify you have entered your information correctly | Contact customer and request another method of payment. May escalate to merchant support for possible resolution |
| 100 | Approved | Display "Thank You" page | | |
| 547 | Address Verification Failed | Return user to Page, allow 3 attempts to use credit product before removing credit issuer as an option | Credit Issuer was unable to authorize your transaction. Please verify you have entered your information correctly | This would be an upfront decline only. |
| 548 | Not on Credit Bureau | Return user to Page, allow 3 attempts to use credit product before removing credit issuer as an option | Credit Issuer was unable to authorize your transaction. Please verify you have entered your information correctly | This would be an upfront decline only. |

Figure 5:
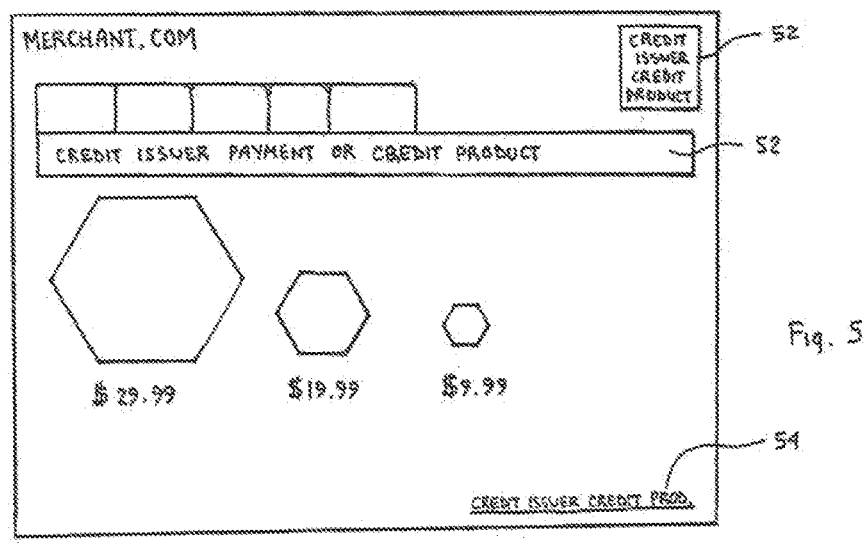
FIG. 5 is an example of a screen displayed to a user in connection with one embodiment of a distributed system for commerce according to the principles of the present invention.
Figure 6:
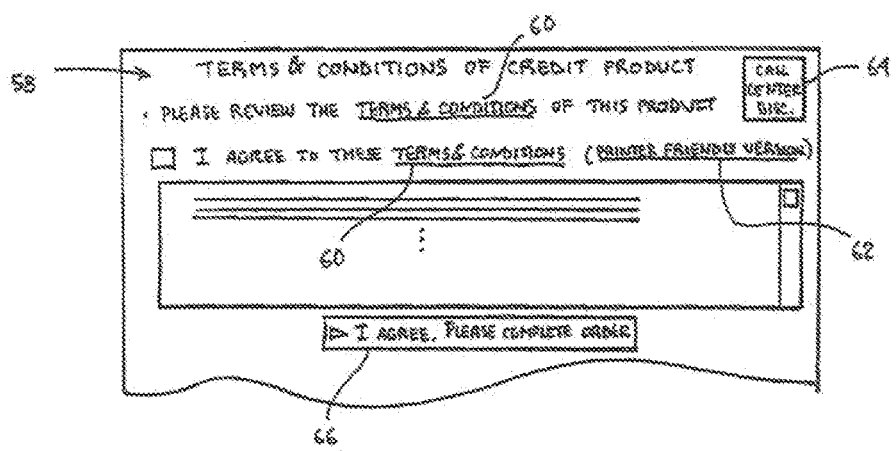
FIG. 6 is an example of another screen displayed to a user in connection with one embodiment of a distributed system for commerce according to the principles of the present invention.

As discussed above in detail, delivery of content 24 between the intermediate server system 18 and the merchant system 12 may be in many different forms and formats. For example, the content 24 may be referenced and provided to the user U in the form of a pop-up window. By using this referencing technique, the merchants are insulated from making the required changes to various documents due to regulatory product changes. Two key files may be referenced by the merchant system 12 at the intermediate server system 18, including an informational window 52, which links from various credit issuer system 44 or intermediate server system 18 links, text messages and banners. This file would contain a description of the product, required disclosures and frequently ask questions. In this embodiment, the user U would click on various banners 52 or text links 54, as illustrated in FIG. 5. Again, the action of clicking on these banners 52 or text links 54 may either present content 24 to the user U from the merchant system 12 and/or the intermediate server system 18. Another key file would be the terms and conditions 56 offered for the credit product. Such content 24 would generally be essentially served by the intermediate server system 18, which allows the content 24 to be managed on behalf of the merchant.

Depending upon what banner 52 or text link 54 is activated by the user U, different versions will be provided and served to the user U. For example, certain default content 24 may be provided and displayed to the user U when promotional financing is not being offered. However, and depending upon the banner 52 or text link 54, certain other content 24 may be displayed to the user U when promotional financing is available.

In one implementation, the terms and conditions 56 are presented to the user U on a payment page 58. The terms and conditions 56 may be presented in a variety of formats. For example, an HTML version 60 may be presented to, the user U via text links 54, and a PDF version may be presented to the user U upon activating a "printer friendly version" link 62. The links provided in this application or payment page may utilize well-known e-sign and other acknowledgement techniques. Activating a phone order link 64 directs the user U to the disclosure requirements for various phone orders, such as in a promotional financing informational window. Once the user U agrees to the terms and conditions 56, he or she would activated an agreement button 66, which would complete the order using the associated credit product.

In this manner, the present invention provides a distributed system 10 for commercial transactions, and is particularly useful in connection with online and remote commerce between consumers and merchants. The distributed system 10 of the present invention provides content 24 to the user U through the merchant system 12, and this content 24 is provided to the merchant through the intermediate server system 18. Alternatively, certain content 24 is provided directly to the user U by the intermediate server system 18, such as through the intermediate server system interface 34. In addition, the present invention provides a system 10 that facilitates credit-based and debit-based transactions between a consumer, a merchant and a credit (or debit) issuer. Still further, the content 24 provided to the user U is dynamic and accurate. Still further, the system 10 of the present invention provides an intermediary between the merchant system 12 and the payment processing system 40 and/or the credit issuer system 44. Accordingly, the present invention is directed to a distributed system 10 for commerce that provides secure communications and facilitates transactions in an electronic, online, telephone or other remote environment.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An intermediate server system, comprising:
    a non-transitory memory storing transaction data; and
    one or more hardware processors configured to execute instructions to cause the intermediate server system to perform operations comprising:
        determining, from a web service call received from a merchant system of a merchant to validate an online transaction initiated by a user device of a user at the merchant system, embedded user information and order information associated with the online transaction;
        validating the user information and the order information embedded in the web service call;
        determining credit content data stored by the intermediate server system based on the user information and the order information, wherein the credit content data is associated with a credit product available with a credit issuer system;
        certifying the credit content data with the credit issuer system prior to a transmission of the credit content data to the user device;
        outputting, by the intermediate server system, the credit content data through a first application programming interface (API) of the intermediate server system directly to the user device, wherein the credit content data is output through an interface of the intermediate server system by the first API without transmission to the merchant system, and wherein the interface comprises a link with the intermediate server system to the credit content data;
        receiving the transaction data associated with the online transaction, wherein the transaction data comprises an acceptance of the credit product through the first API;
        determining first data points of the transaction data capable of being processed by a second API of a payment processor system, wherein the first data points comprise common feature data across payment options processable by the second API of the payment processor system;
        determining, from the transaction data, a first set of data required by the second API for a transaction permission data based on the first data points;
        formatting the first set of data of the transaction data based on a data format required by the second API of the payment processor system;
        transmitting the first set of data of the transaction data to the second API of the payment processor system;
        determining a second set of data that is unique to the credit product in the transaction data;
        transmitting the second set of data to the credit issuer system;
        receiving a credit issuance result from the credit issuer system for the credit product based on at least the first set of data and the second set of data;
        receiving a transaction processing result from the payment processor system based on the credit issuance result; and
        outputting the credit issuance result and the transaction processing result through the interface of the intermediate server system.

2. The intermediate server system of claim 1, wherein the online transaction is initiated on a website of the merchant displayed on the user device, and wherein the interface comprises a pop-up window displayed with the website.

3. The intermediate server system of claim 1, wherein the interface comprises a web form displayed on the user device, and wherein the web form is configured to be populated with the transaction data.

4. The intermediate server system of claim 1, wherein the second set of data includes data associated with an offer of the credit product to the user.

5. The intermediate server system of claim 4, wherein the non-transitory memory further stores the credit content data relating to the offer of the credit product, and wherein the operations further comprise:
monitoring the credit content data relating to the offer.

6. The intermediate server system of claim 1, wherein the operations further comprise:
determining the data format of the first set of data required by the second API.

7. The intermediate server system of claim 1, wherein the payment processor system processes a payment directly to the merchant using only the first set of data.

8. A method, comprising:
determining, by an intermediate server system from a web service call received from a merchant system of a merchant to validate an online transaction initiated by a user device of a user at the merchant system, embedded user information and order information associated with the online transaction;
validating the user information and the order information embedded in the web service call;
determining credit content data stored by the intermediate server system based on the user information and the order information, wherein the credit content data is associated with a credit product available with a credit issuer system;
certifying the credit content data with the credit issuer system prior to a transmission of the credit content data to the user device;
outputting, by the intermediate server system, the credit content data through a first application programming interface (API) of the intermediate server system directly to the user device, wherein the credit content data is output through an interface of the intermediate server system by the first API without transmission to the merchant system, and wherein the interface comprises a link with the intermediate server system to the credit content data;
receiving, by one or more processors, transaction data associated with the online transaction, wherein the transactional data comprises an acceptance of the credit product through the first API;
determining first data points of the transaction data capable of being processed by a second API of a payment processor system, wherein the first data points comprise common feature data across payment options processable by the second API of the payment processor system;
determining, from the transaction data, a first set of data required by the second API for transaction permission data based on the first data points;
formatting, by the one or more processors, the first set of data of the transaction data based on a data format required by the second API of the payment processor system;
transmitting, by the one or more processors, the first set of data of the transaction data to the second API of the payment processor system;

determining a second set of data that is unique to the credit product in the transaction data;
transmitting, by the one or more processors, the second set of data to the credit issuer system;
receiving a credit issuance result from the credit issuer system for the credit product based on at least the first set of data and the second set of data;
receiving a transaction processing result from the payment processor system based on the credit issuance result; and
outputting the credit issuance result and the transaction processing result through the interface of the intermediate server system.

9. The method of claim 8, wherein the online transaction is initiated on a website of the merchant displayed on the user device, and wherein the interface comprises a pop-up window displayed by the intermediate server system with the website.

10. The method of claim 8, wherein the interface comprises a web form displayed on the user device, and wherein the web form is configured to be populated with the transaction data.

11. The method of claim 8, wherein the second set of data is further used to facilitate an offer of the credit product to the user.

12. The method of claim 11, further comprising:
accessing, by the one or more processors from a data storage system, the credit content data relating to the offer of the credit product; and
monitoring, by the one or more processors, the credit content data relating to the offer.

13. The method of claim 8, further comprising:
determining the data format of the first set of data required by the second API.

14. The method of claim 8, wherein the payment processor system processes a payment directly to the merchant using only the first set of data.

15. A non-transitory machine-readable medium having stored thereon machine-readable instructions executable to cause a machine to perform operations comprising:
determining, by an intermediate server system from a web service call received from a merchant system of a merchant to validate an online transaction initiated by a user device of a user at the merchant system, embedded user information and order information associated with the online transaction;
validating the user information and the order information embedded in the web service call;
determining credit content data stored by the intermediate server system based on the user information and the order information, wherein the credit content data is associated with a credit product available with a credit issuer system;
certifying the credit content data with the credit issuer system prior to a transmission of the credit content data to the user device;
outputting the credit content data through a first application programming interface (API) of the intermediate server system directly to the user device, wherein the credit content data is output through an interface of the intermediate server system by the first API without transmission to the merchant system, and wherein the interface comprises a link with the intermediate server system to the credit content data;
receiving transaction data associated with the online transaction wherein the transactional data comprises an acceptance of the credit product through the first API;

determining first data points of the transaction data capable of being processed by a second API of a payment processor system, wherein the first data points comprise common feature data across payment options processable by the second API of the payment processor system;

determining, from the transaction data, a first set of data required by the second API for transaction permission data based on the first data points;

formatting the first set of data of the transaction data based on a data format required by the second API of the payment processor system;

transmitting the first set of data of the transaction data to the second API of the payment processor system;

determining a second set of data that is unique to the credit product in the transaction data;

transmitting the second set of data to the credit issuer system;

receiving a credit issuance result from the credit issuer system for the credit product based on at least the first set of data and the second set of data;

receiving a transaction processing result from the payment processor system based on the credit issuance result; and outputting the credit issuance result and the transaction processing result through the interface of the intermediate server system.

16. The non-transitory machine-readable medium of claim 15, wherein the online transaction is initiated on a website of the merchant displayed on the user device, and wherein the interface comprises a pop-up window displayed by the intermediate server system with the website.

17. The non-transitory machine-readable medium of claim 15, wherein the interface comprises a web form displayed on the user device, and wherein the web form is configured to be populated with the transaction data.

18. The non-transitory machine-readable medium of claim 15, wherein the second set of data is further used to facilitate an offer of the credit product to the user.

19. The non-transitory machine-readable medium of claim 18, the operations further comprising:
    accessing, from a data storage system, the credit content data relating to the offer of the credit product; and
    monitoring the credit content data relating to the offer.

20. The non-transitory machine-readable medium of claim 15, wherein the operations further comprise:
    determining the data format of the first set of data required by the second API.

* * * * *